Aug. 9, 1932.    J. C. SHAW ET AL    1,871,224
ELECTRICAL CONTROL OF THE FEED OF PLANERS AND LIKE MACHINE TOOLS
Filed July 19, 1927    2 Sheets-Sheet 1
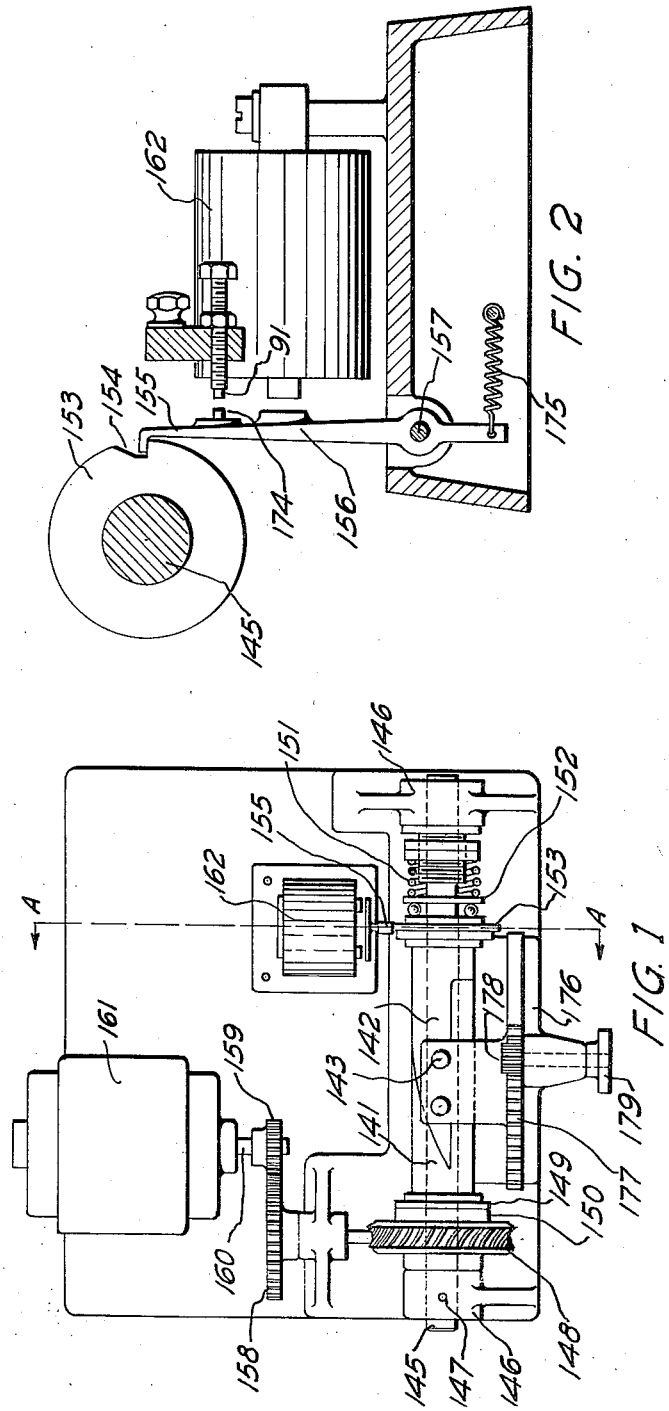
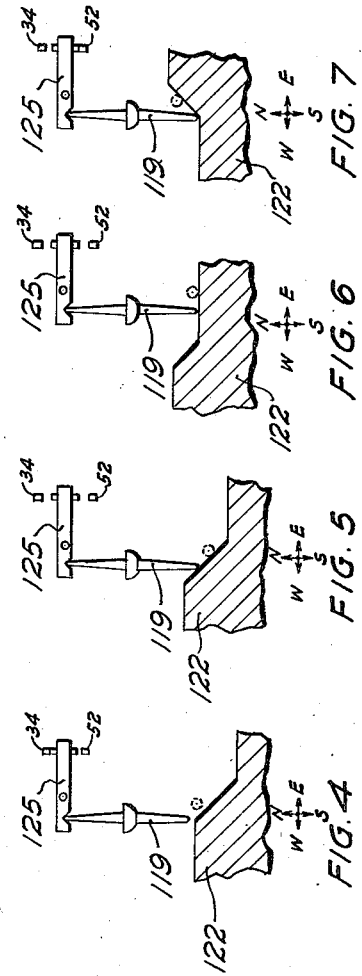
INVENTORS.
John C. Shaw and
Robert D. Shaw
BY
M. H. Lockwood
ATTORNEYS.

Aug. 9, 1932.  J. C. SHAW ET AL  1,871,224
ELECTRICAL CONTROL OF THE FEED OF PLANERS AND LIKE MACHINE TOOLS
Filed July 19, 1927   2 Sheets-Sheet 2
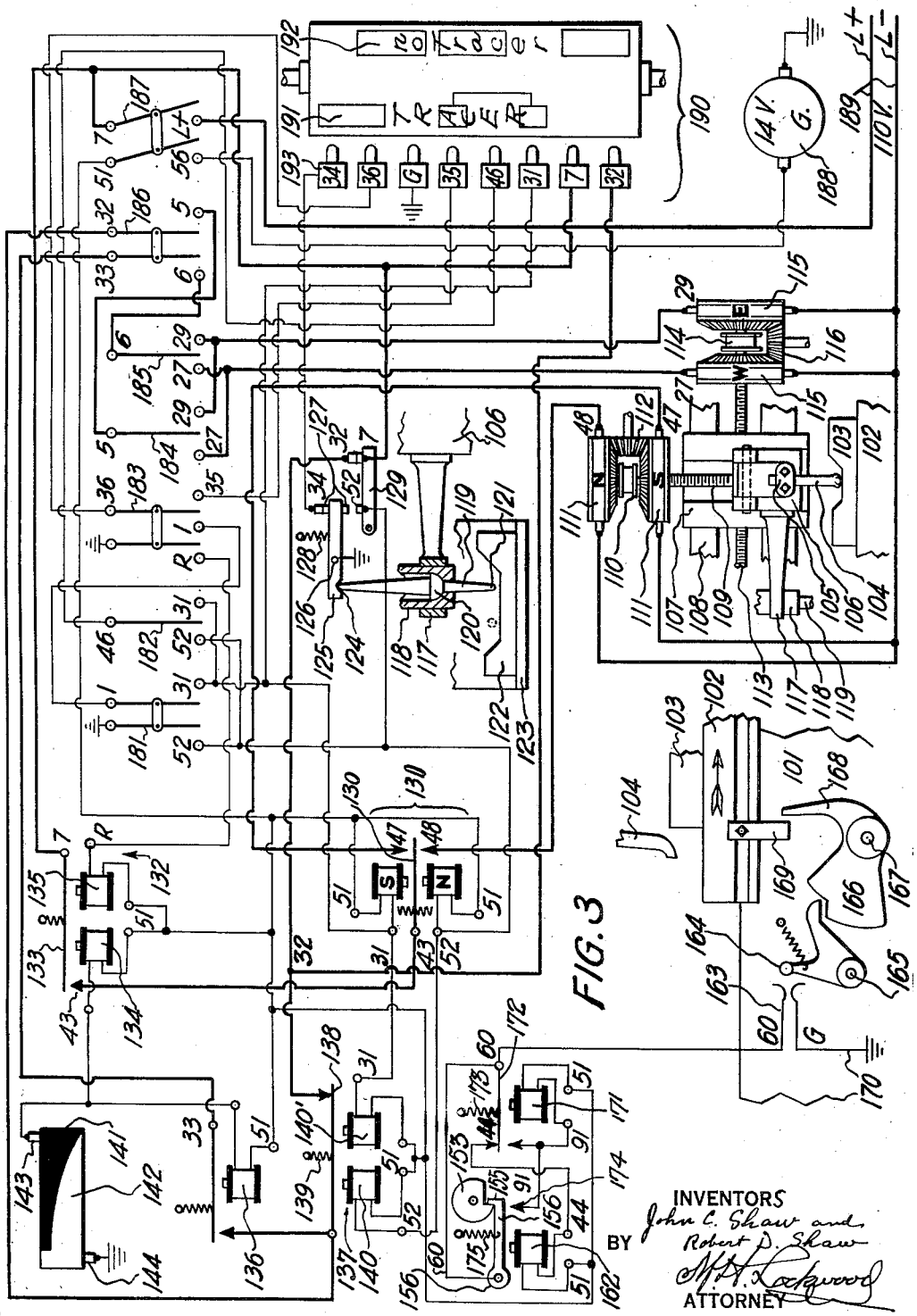

Patented Aug. 9, 1932

1,871,224

UNITED STATES PATENT OFFICE

JOHN C. SHAW AND ROBERT D. SHAW, OF BROOKLYN, NEW YORK, ASSIGNORS, BY MESNE ASSIGNMENTS, TO PRATT & WHITNEY COMPANY, OF HARTFORD, CONNECTICUT, A CORPORATION OF NEW JERSEY

ELECTRICAL CONTROL OF THE FEED OF PLANERS AND LIKE MACHINE TOOLS

Application filed July 19, 1927. Serial No. 206,824.

This improvement relates more particularly to the control of the horizontal and vertical feeds in planers or like machine tools, wherein a continuous linear cut is effected by the reciprocation of either the tool or the work. Machines of this character, such as planers, shapers, slotters and the like are adapted to effect a linear cut by relative motion between the work and the tool in one direction, that is, during the cutting stroke, while upon the return stroke or during reverse motion of the reciprocating member the tool is idle and the horizontal or vertical feed may be effected.

In planers and like machine tools, as ordinarily operated by hand or mechanical control, the reproduction of a specific cross section for the work is difficult, if not impossible, in that the motions or feeds are adapted to be manipulated entirely without specific control and, therefore, to accurately follow a pattern is not possible.

The primary object, therefore, of our improvement is to control the horizontal and vertical motions, and provide for the operation thereof by means of electro-magnetic clutches, which may be brought into operation automatically or manually when desired. By vertical motion is meant the relative toward and from movement between the tool and the work, which is preferably effected by electro-magnetic clutches, normally placed under automatic control of an electric tracer, adapted to follow a pattern. The arrangement and control through the tracer is such that the two motions, that is, horizontal and vertical, are interlocked through the electric tracer and suitable relays so that as the tracer follows the pattern one or the other or both motions will position the tool so that the cross section, represented by the pattern, will be reproduced in the work.

A further object is to provide for the operation of the magnetic clutches by main line current of relatively high potential, while the control thereof is by means of relays operating on relatively low potential current, the latter preferably operating through suitable switches and contacts controlled by the electric tracer.

Furthermore, it will be understood that since the relative feeds, both horizontal and vertical, are effected during the non-cutting or reverse stroke between the tool and the work, an additional object of our improvement is to provide novel means for effecting or permitting horizontal and/or vertical feed over a predetermined period during the reverse movement of the reciprocating member, the period being variable according to previous adjustment to vary the width or depth of cut required.

In carrying out the last mentioned object, we preferably employ a rotatable commutator, having a tapering segment, adapted for rotation by means of suitable friction drive connections with a motor, so that the commutator may be held by a suitable detent and prevented from rotation except at predetermined intervals.

A further object, therefore, is to provide suitable escapement devices or mechanism such as contacts or switches and relays under control of the reciprocating member for releasing the rotatable commutator, to effect the feeds upon the reverse stroke of the machine, means being provided for shifting the position of the commutator brushes for varying the length of time the commutator circuit is closed, to thereby vary the time during which horizontal or vertical feed may be effected, and, hence control the amount thereof.

A further object is to provide for push button or manual control of the horizontal and vertical motions, such control being preferably by means of suitable push button or hand switches, operating through the respective relays and magnetic clutches, as distinguished from the ordinary manual operation by hand wheels.

A further object is to provide a drum switch, through which various circuits are carried, so that by positioning the drum switch, control of the motions may be through, or by means of the tracer, or the tracer control may be eliminated, and the electrical mechanism employed to effect right line feeds, either vertical or horizontal, between the tool and the work for ordinary planing, thereby eliminating the necessity of equipping the planer with the customary mechanically operated feeds.

In carrying out these and other objects, our improvement, while being capable of adaptation for various types of machines effecting a linear cut, is preferably illustrated herein by showing its adaptation to a planer, wherein the slide or table, supporting the work, is reciprocated to effect the linear cut, and the tool is mounted for toward and from or vertical movement to vary the depth of cut, and for horizontal movement to vary the position of the cut.

In the accompanying drawings, Fig. 1 shows a top plan view of the motor driven commutator for controlling the feed; Fig. 2 is a transverse vertical section, illustrating the relay magnet for releasing the commutator for a single rotation; Fig. 3 is a wiring diagram, showing portions of the planer and the control mechanism schematically, and Figs. 4 to 7 inclusive, are diagrammatic figures showing operative positions of the tracer relative to the pattern.

The electric tracer circuits which we have provided for controlling the vertical and horizontal movements of the tool under the control of the tracer, operating through suitable relays and magnetic clutches, are a modification based upon the arrangement shown and described in the patent of John C. Shaw, No. 1,683,581 of September 4, 1925. filed March 4, 1924, for electrical operation and control of machine tools. In the Shaw patent just referred to, however, the control is in three planes at right angles to each other, while in planers and machine tools, wherein a linear cut is effected by relative motion between the work and tool, control is required only in two planes at right angles to each other or horizontally and vertically in a plane at right angles to the direction of the linear cut.

As shown in the schematic wiring diagram of Fig. 3, the planer 101, is provided with a reciprocating carriage or table 102, upon which the work 103 is mounted in the usual or any preferred manner. The construction and operation of a planer is so well known that it is not deemed necessary to show a complete machine, but merely show certain parts schematically and then point out how our improved electric tracer control is adapted therefor.

In a planer, the tool 104 is adapted to effect a linear cut on the work by reciprocation of the table 102, the tool being mounted on the usual swinging support 105, so that, since the cut is effected only during movement in one direction (indicated by the arrow on the table 102), the tool will swing free upon the reverse movement or non-cutting stroke of the table and work. The swinging tool holder 105 is mounted upon a vertically movable slide or carriage 106, slidably supported on the horizontally movable slide or carriage 107, the latter being slidably mounted upon ways 108, for horizontal movement of the tool carriage in the well known manner.

The vertically movable tool carriage 106 is adapted to be moved toward and from the work by means of the usual feed screw 109, which, in the present instance, is operatively connected to a clutch armature 110, cooperating with a pair of magnetic clutch members 111. The clutches 111 (designated N and S) are adapted to be rotated in opposite directions by bevel gears, meshing with a pinion 112, the latter being motor driven, substantially as shown and described in the Shaw patent hereinbefore referred to. It will be understood that the arrangement is such that by energizing one or the other of the magnetic clutches 111, the tool 104 will be moved either (S) toward or (N) from the work, and, as hereinafter described, the energization of the magnetic clutches 111 is under the control of an electric tracer, when the machine is to operate automatically as the tracer follows a pattern.

Likewise, the horizontally movable slide or carriage 107, upon which the tool carriage 106 and the vertical magnetic clutches 111 are mounted, is adapted to be fed across the machine, at right angles to the direction of reciprocation of the table 102, by means of the usual feed screw 113, which, in the present instance, is keyed or operatively connected to a magnetic clutch armature 114, cooperating with a pair of magnetic clutch members 115 (designated E and W). The magnetic clutch members 115 are adapted to be rotated in opposite directions by the bevel pinion 116, motor driven in the same manner as the magnetic clutches 111, and as described in the Shaw patent, previously referred to. By energizing one or the other of the magnetic clutches 115, the screw 113 will move the carriage 107, and hence the tool 104, either (E) to the right or (W) to the left, transversely of the direction of the linear cut made by the tool. In this manner, the horizontal positioning of the tool for the succeeding linear cuts on the work is effected.

In our electric tracer control of the planer, an electric tracer (118) substantially of the form shown in Fig. 16 of the Shaw patent, above referred to, is adapted to be supported on a bracket arm 117, preferably secured to and projecting laterally from the vertical slide carriage 106, which, as previously described, is the immediate support of the tool 104, so that the tracer will be adapted to partake of both the vertical and horizontal movements imparted to the tool by movements of the respective feed screws 109 and 113. The electric tracer 118, supported in the bracket 117, is provided with a tracer spindle 119 mounted for universal movement by means of a ball and socket joint at 120, and is provided with a tracer point 121, adapted to cooperate with a pattern 122. The pattern 122 is preferably supported by means of a bracket 123, carried on a fixed portion of the machine, so as to lie parallel to a transverse section of the work, the pattern corresponding to a transverse section of the cut to be reproduced in the work.

The tracer spindle 119 is provided with a spherical point 124 on the end opposite the tracer point 121, this spherical point engaging a cone socket in a contact carrying lever 125 which is grounded, the lever being pivoted at 126 and provided with contacts 127, cooperating respectively with contacts for circuits 34 and 52, the contact at 34 being normally held closed by means of a spring 128. As described in the Shaw patent, above referred to, the contact at 52 is preferably mounted upon an auxiliary lever 129, which carries contacts for circuit 7 for completing the high potential circuit to the magnetic clutches.

The toward and from, or vertical feed of the tool is adapted to be effected by energization of one or the other of the magnetic clutches 111, the energization of which is controlled by a directional relay 130, provided with magnets, marked N and S, corresponding respectively with the magnetic clutches 111, marked N and S. It will be understood that the magnetic clutch 111 and magnet of relay 130 marked N are for controlling north or up feed; that is, relative movement of the tool from the work. Similarly, the magnet of relay 130 and magnetic clutch 111 marked S are for controlling south or down feed; that is, relative feed of the work and tool toward each other. As indicated in Fig. 3, the relay 130 magnets N and S cooperate with an armature 131 adapted to close contacts 47 and 48 for directing high potential current to one or the other of the vertical magnetic clutches 111, N or S, according to the direction determined by the contacts for circuits 34 and 52 of the electric tracer. The normally closed contact for circuit 34 controls south or down feed, or relative toward movement of the tool and work.

It has previously been pointed out that relative feed between the tool and the work must be effected only during the return stroke after each liner cut has been made and, obviously, it is necessary to regulate the amount of feed, for otherwise, the magnetic clutches, if energized continuously during the return stroke, would move the tool relative to the work an excessive amount. This is true of the horizontal as well as of the vertical movement. Therefore, it is preferable to limit the period for vertical feed, even though operating under control of the tracer, and for this purpose, a vertical feed relay 132 is provided. This relay 132 is provided with an armature 133 cooperating with a contact to close circuit 43 of the high potential circuit to the armature 131 of the directional relay 130. Closing the contact of the armature 133 to the circuit 43 is adapted to be effected by energizing either magnet 134 or 135 of the split relay 132.

Closing circuit 43 by energizing magnet 135 is adapted to be effected under manual control by closing switch 183 to circuit R, as will be seen by wiring diagram Fig. 3, from which it also will be seen that energization of the vertical feed relay magnet 134 is adapted to be effected intermittently through a feed controlling commutator (141), operated intermittently through a relay, upon the noncutting stroke of the machine, as hereinafter described.

Control of horizontal movement between the tool and the work differs from control of the toward and from movement, in that the direction is not subject to change by means of the tracer, it being understood that after the direction of horizontal movement has been selected, that is, either toward the right or toward the left, there is no need for changing this direction during the traverse of the tool across the work. Hence, a hand switch (185) is provided for determining the direction of movement either right or left, and a horizontal feed relay 136 is provided for closing the high potential circuit for energizing one or the other of the magnetic clutches 115; the clutch so energized being determined by a hand operated switch 185, as hereinafter pointed out, so that each time the horizontal feed relay 136 is energized, the high potential circuit will be closed to the selected magnetic clutch, (E or W) to effect the horizontal traverse of the tool.

It has been found desirable to interlock the horizontal and vertical motions through the tracer, so that both motions cannot be operated at the same time. In this connection, a horizontal interlock relay 137 is provided, in which the armature 138, by means of a spring 139 is normally held closed to the high potential circuit 32. When, however, one of the magnets 140 or 140' of the split relay 137 is energized, the armature 138 is drawn down and the high potential circuit 32 is broken, thus preventing operation of the horizontal motion. From Fig. 3, it will be seen that the magnet 140 of the horizontal interlock relay 137 is connected in parallel with the magnet N of the relay 130 and both are connected in series with the back contact for circuit 52 at the tracer. It will thus be understood that if the contact 127 for the circuit 52 is closed, the coils 140 of relay 137 and N of the relay 130 will be energized and the armature 138 of the horizontal interlock relay 137 will be operated to break the circuit 32 to the horizontal magnetic clutches 115.

The magnet 140' of the horizontal interlock relay is connected in the same way with the S magnet of the relay 130 and the front contact for circuit 34 at the tracer, so that, similarly, when the front contact 127—34 of the tracer is closed the horizontal interlock relay is operated to break the circuit 32 (through switches 184 or 185 and circuits 27 or 29) to the horizontal magnetic clutches 115. In other words, when either the front or back contact 127 of the tracer is closed, for energizing one or the other of the magnets S or N of relay 130 to effect toward or from movement of the tool, the horizontal interlock relay 137 will be actuated to break the circuit of the horizontal magnetic clutches and prevent horizontal traverse movement. It will, therefore, be apparent that horizontal movement for successive cuts can be effected only when both front and back contacts 127 (circuits 34 and 52) of the tracer are open, and only then will closing circuit 33 by energizing the horizontal feed relay magnet 136 be effective for the traverse feed movement.

In order to close the low potential or relay operation circuit 51, to the horizontal and vertical feed relays (132 and 136) at predetermined intervals, that is, on the return or non-cutting stroke of the machine, and for a predetermined length of time, any suitable escapement and/or sliding mechanism may be provided, but, in the present instance, we preferably employ a rotatable commutator 141 (Figs. 1 and 3), provided with a wedge-shaped commutator segment 142, tapering longitudinally from substantially 90% of the circumference at one end, to almost a point at the other end. A suitable contact brush 143 is mounted in position to cooperate with the commutator segment, the brush being preferably slidable to various positions, longitudinally of the commutator, so as to vary the length of the circumferential contact thereof with the segment, and hence vary the length of time the circuit is closed. A second contact brush 144, preferably engaging a ring formed as part of or connected with the segment, is grounded to complete the circuit through the segment substantially as shown in Fig. 3.

The commutator 141 is preferably adapted to be operated only for one rotation during each reverse or non-cutting stroke of the reciprocating member and during that single rotation, the circuit to the horizontal and vertical feed relays is adapted to be closed to effect the feed, the amount of which is governed by the position of the brush 143, longitudinally of the wedge-shaped segment 142. For rotating the commutator 141 and releasing it for its single rotation, we preferably employ the mechanism shown in Figs. 1 and 2, although we are not limited to this arrangement. The commutator 141 is preferably mounted loosely upon a shaft 145, supported in brackets 146 and prevented from rotation by a pin 147. A worm wheel 148 is also rotatably mounted upon the shaft 145 and between the wheel 148 and a flange 149 on the commutator, there is preferably mounted a cork disc or washer 150, to serve as a friction drive between the worm wheel and commutator. Any suitable means may be provided for holding the disc 149 in frictional engagement with the driving member, such as the spring 151 operating against a ball thrust bearing 152 at the opposite end of the commutator, as will be seen in Fig. 1. In the present instance, the commutator 141 is provided with an escapement or detent controlled disc 153, secured to the right hand end as viewed in Fig. 1, this disc being preferably provided with a single detent notch 154, as shown in Fig. 2. A detent latch 155, mounted on the upper end of an armature 156 and pivoted at 157, is adapted to engage the notch 154 in the disc 153 and prevent rotation of the commutator 141. The friction disc 150 permits the commutator to be held against rotation, while the worm wheel 148 is rotated continuously during the operation of the machine. For the purpose of rotating the worm wheel 148, the worm is preferably connected by gears 158—159, to the shaft 160 of a motor or motor generator 161, which in the present instance is preferably the motor generator supplying the low potential or 14 volt circuit for operating the relays.

To release the commutator 141 for a single rotation, the detent 155 for releasing the disc 153, is preferably operated by an electro-magnet 162, the circuit of which is adapted to be closed through a spring finger switch 163, operating on the low potential circuit, substantially as indicated in Fig. 3. In order that the switch 163 may be closed, a switch closing bar 164 is preferably carried by a lever, adapted to be operated by the reversing mechanism of the planer. For the purpose of illustration, the switch closing lever is shown as pivoted at 165 and adapted to be operated by a cam arm 166, mounted on the planer reversing rock shaft 167, the cam arm being provided with a finger 168, adapted to cooperate with the usual or any preferred adjustable dog 169 on table 102, for effecting the reverse. The switch bar 164 is adapted to be moved into position to close the circuit through the spring fingers 163 during the non-cutting stroke of the reciprocating member, the circuit being completed by grounding at 170. The magnet 162 will thus be energized so as to attract the armature 156 and thereby release the disc 153 to permit rotation of the commutator 141, by the friction drive from the worm wheel 148.

It is obvious that, since the switch bar 164 is closed during the entire non-cutting stroke of the reciprocating member, means must be provided for independently breaking the circuit through the magnet 162, or in some manner prevent more than a single rotation of the commutator 141. For this purpose, we preferably employ a relay magnet 171, adapted to be associated with the detent releasing mechanism so that its armature 172 is normally held away from the magnet by a spring 173, so as to close circuit 60 through the armature and circuit 44 to the magnet 162. As soon, however, as the magnet 162 is energized, a contact 174, cooperating with circuit 91, will be closed to energize the relay magnet 171, which, in turn, will attract its armature 172 and break the circuit 44 to the magnet 162, at the same time closing the circuit 60 through the armature 172, to the circuit 91 of the relay magnet 171, this circuit remaining closed until switch 163—164 is again opened, thereby permitting the armature 156 to be returned to normal position by its spring 175. By this arrangement, it will be seen that immediately, following the release of disc 153 and the closing of the circuit through magnet 171, the detent 155 will be restored to its normal position by its spring 175, to again engage the notch 154, so that the commutator 141 can make only a single rotation at a time, and then, only by closing switch 164.

From Fig. 3, it will be seen that the low potential circuits controlling the relays 136 and 132 (magnet 134) for horizontal and vertical feeds respectively, are adapted to be completed through the commutator brush 143 cooperating with the segment 142 and the ground through brush 144, before either of these movements can be operated. Normally, the commutator brush 143 rests on the insulated portion of the commutator, when the latter is held against rotation by the detent 155, and the circuit is closed only as the brush 143 passes over the segment 142 during the single rotation of the commutator. The brush 143, as will be seen in Fig. 1, is preferably mounted on a slide 176, so that its position longitudinally of the commutator may be adjusted to vary the amount or length of circuit closing contact with the commutator. Suitable means, such as the rack 177 and pinion 178 operated by a knurled head 179 may be provided for shifting the position of the brush 143. By this arrangement, it will be seen that when the brush is at the wide end of the segment, the circuit to the relay magnets will be closed for the greatest length of time, thus effecting the greatest amount of feed, while when the brush is located near the point of the commutator segment 142, the relay circuits will be closed for a minimum amount of time, and the amount of feed will be exceedingly small. It will be understood that the speed of rotation of the commutator may also be prearranged by selection of the gearing 158 and 159, in order to predetermine the length of time the relay circuits are to be closed through the commutator segment.

For manual control and for starting and predetermining various operations of the machine, a plurality of push button switches is preferably provided, these switches being indicated in the wiring diagram of Fig. 3.

Switch 181, at the left, is preferably a double switch for closing the vertical feed circuits momentarily.

The second switch 182, in the series, is also a double switch for determining the direction of vertical feed when the drum controller is at "no tracer" position and the tracer not in use.

The third switch 183, is a double switch, which when thrown in one direction, places in operation the hand or manual control, while when thrown in the other direction the machine is adapted to operate automatically.

The fourth switch 184, is a double momentary contact switch for the manual operation of the horizontal motion.

The fifth switch 185 is represented as a double switch, for determining the direction of horizontal automatic feed, that is, either toward the right or toward the left, according to the way this switch is set.

The sixth switch 186 is a double contact switch, for setting the horizontal motion for hand or automatic operation.

The seventh switch 187 is the main switch for closing both the low potential control circuit from a 14 volt generator 188 and the main line high potential operating circuit from leads 189.

In order to provide for placing the machine under tracer control, or for operation after eliminating tracer control, a drum controller or switch 190 is preferably employed. This drum controller corresponds to the drum switch shown and described in the Shaw patent, above referred to, except that in the present instance, only two lines of contact bars 191 and 192 are provided. When the line of contact bars 191 are in circuit closing relation with the contact fingers, represented on the line 193, it will be seen that the circuits are arranged for tracer control, while when the line of contact bars 192 are in operative relation with the line of contact fingers 193, tracer control is eliminated and the electrical mechanism may be then employed to effect regular feeds, either vertical or horizontal, between the tool and the work for ordinary planning, thereby eliminating the necessity of equipping the planer with the customary mechanically operated feeds, and also placing the planer under hand control, when momentary switches 181 and 184 are used.

The three switches on the left hand side 181, 182 and 183 control the vertical motion and the next three switches, 184, 185 and 186 control the horizontal motion. The last switch 187 is the main switch and has to be closed whenever the planer is put in operation. This switch closes the power circuit at L and 7 and at the same time the low voltage control circuit 56 from the motor generator to 51.

The position of switches 183 and 186 determines whether the planer shall be operated automatically, that is under tracer control or without the tracer for straight line feed, or by hand, that is by operating momentary switches 181 and 184.

Switch 183 closing R to ground and 36 to 1 and switch 186 closing 32 to 5 put the machine under hand control, that is, if momentary switch 181 is closed from 52 to ground, the tool will move up and if closed from 31 to 1 the tool will move down—or if switch 184 is closed from 5 to 27 the tool will move towards west and if the same switch is closed from 5 to 29 the tool will move towards east. For this mode of operation the drum controlled is set to the "no tracer" position then no tracer is necessary and it is preferably disconnected.

If the switches 183 and 186 are set for automatic operation, that is, switch 183 is closing 35 to 36 and switch 186 is closing 33 to 6, two modes of operation are possible.

*First.*—If the planer shall be used as ordinarily, that is for ordinary planing, no tracer is necessary and the drum controller is placed in the "no tracer" position. If the feed is operated horizontally, switch 185 is to be closed to either 27 or 29 to determine the direction (W or E) for the horizontal feed.

If it is desired that the feed shall operate vertically, switch 182 is to be closed to either 46—52 or 46—31 to determine the direction of the vertical feed.

*Second.*—If the planer is to be used for an automatic profiling operation from a template, the tracer has to be used and the drum controller should be put on the "tracer" position. Switches 183 and 186 are closed as described before, that is, closing 35 to 36 and 33 to 6. Then the position of switch 185 (closing either 6—27 or 6—29) determines the direction of the horizontal feed and the tracer contacts 34 and 52 control the vertical motion automatically.

It is believed that from the above description, and by means of the wiring diagram in Fig. 3, the various circuits can be readily traced, so that it will not be difficult to understand the operation, either automatically, with or without tracer, or by manipulating the switches for manual control.

The three distinct ways the planer can be operated may be brifly stated as follows:—

1. *Planer under tracer control.*

Drum switch (190) on "tracer" (contact bars 191).

Switch 183 closed to right (35—36) (vert. automatic).

Switch 186 closed to left (33—6) (horiz. automatic).

Switch 185 closed to either 6—27 or 6—29 to determine direction of horizontal feed.

The circuit for the horizontal magnets is in this case carried over the tracer back-gap 7 (lever 129).

2. *Planer operated as normally, that is, without tracer.*

Automatic feed of the tool either in vertical (up or down) or in horizontal (left or right) direction.

Drum switch (190) or "no tracer" (contact bars 192).

For vertical feed close switch 182 to either 46—31 for "down feed" or to 46—52 for "up feed" and also switch 183 to right (35—36) vertical automatic.

For horizontal close switch 183 to either 6—27 for "left feed" or to 6—29 for "right feed", and also switch 186 left (33—6) (horiz. automatic).

3. *Planer under hand control (without tracer).*

Drum switch (190) on "no tracer" (contact bars 192).

Switch 183 closed to left to 36—1 and R to ground (vert. hand).

Switch 186 closed to right to 32—5 (horiz. hand).

By closing momentary switch 181 to either 52—ground or 31—1 machine will move up or down.

By closing momentary switch 184 to either 5—27 or 5—29 machine will move left or right.

Momentary buttons cannot be operated simultaneously.

In ways 2 and 3 for operating the planer, the tracer back gap circuit is replaced by the drum controlled connection 7—32, which makes it possible to disconnect the tracer or take it entirely out of the machine.

In all three cases, the main switch 187 must be closed.

For the purpose of illustrating the operation of the machine, as the tracer follows the pattern, reference may be had to Figs. 4 to 7.

For operating under tracer control, the drum controller 190 is turned so that the line of contact bars 191 cooperate with the contact fingers 193, after which the main switch 187 should be closed and then switches 183 and 186 for automatic operation and switch 185 for right or left directional feed of the horizontal motion. The machine will now operate automatically under the control of the tracer 118—119 and, as represented in Fig. 4, the tracer and tool will move downward toward the pattern and work respectively, the front contact being closed on the low potential circuit 34, which, it will be seen by the wiring diagram Fig. 3, will energize the S magnet in relay 130, the latter in turn, closing the high potential circuit 47, to the S magnetic clutch 111. As previously pointed out, however, the high potential circuit 43—7, for energizing the magnetic clutches 111, N and S, must pass through the armature 133 of the vertical feed relay 132, and this relay is operated to close its armature contact only during the reverse or non-cutting stroke of the reciprocating work table 102 of the planer. To accomplish this upon the reverse of the table stroke, the switch bar 164 closes the circuit through spring contacts 163, thus energizing magnet 162 to attract detent armature 156 and release the commutator 141 for a single rotation. During the rotation of the commutator 141, the brush 143 completes the circuit by passing over the segment 142, thereby energizing magnet 134 of the vertical feed relay and permitting the S magnetic clutch 111 to become energized and thereby effect a predetermined amount of feed of the tool toward the work. The amount of feed thus permitted to take place depends upon the position of the communtator brush 143, longitudinally of the commutator 141, as previously pointed out.

This downward feed of the tracer and tool toward the pattern and work respectively, will continue during each non-cutting or reverse stroke of the planer until the tracer strikes the wall of the pattern, the horizontal line in Fig. 4, when pressure on the tracer spindle 119 will move the contact lever 125 to the middle position, shown for instance in Figs. 5 and 6, thus breaking the front or direct contact and stopping downward feed toward the work and pattern respectively. As previously pointed out, the horizontal interlock relay 137 is interlocked with the N and S magnets of the relay 130, the arrangement being such that opening the front tracer contact will break the circuit to the magnet 140', thereby permitting armature 138 to close the high potential circuit through the armature (138). The horizontal motion can then operate by the energization of one of the magnetic clutches 115 (W or E according to the direction of feed selected through operation of switch 186). The horizontal motion, however, as previously pointed out, depends upon the energization of the horizontal feed relay 136, the magnet of which is adapted to be energized only by closing the circuit through the commutator 141, which, it will be recalled, is permitted one rotation at each reverse or non-cutting stroke of the reciprocating table 102 of the planer.

In following down the incline of the pattern, as shown in Fig. 5, it will be understood that a small amount of horizontal movement toward the right, will release the pressure on the tracer spindle 119 (as shown in Fig. 4) and permit the front (or S) contact to close, so that another increment of downward motion will be effected and this alternate horizontal and vertical motion will continue as the tracer follows the incline.

It is to be understood that the alternate horizontal and vertical movements, above referred to, are controlled entirely by the tracer, and, under this control, are permitted to operate during a predetermined period of time according to the position of the brush 143, longitudinally of the commutator 141. It has been pointed out that current through the commutator energizes the vertical and horizontal feed relays to supply current to the vertical and horizontal magnetic clutches. The horizontal and vertical movement of the two motions during the above mentioned period of time positions the tool for its next cut and constitutes a feed.

In moving over a flat or horizontal portion of the pattern, as indicated in Fig. 6, the front and back contacts of the contact bar 125 will both remain open because of the pressure of the tracer against the flat surface of the pattern, and at each reverse stroke of the planer table, the predetermined amount of horizontal feed will be effected as previously explained.

When the tracer strikes an upward incline, as shown at the right in Fig. 7, it will be understood that continued horizontal movement will produce lateral pressure on the tracer spindle 119, and this will move contact lever 125 far enough to bring the back contact into operation to close circuit 52 to the N magnet of the relay 130, thereby permitting energization of the up, or N, magnetic clutch 111 to move the tracer and tool away from the pattern and work respectively. The moment the back contact circuit 52 is closed, the horizontal interlock relay magnet 140 will be energized and the high potential circuit, through armature 138, for energizing the horizontal magnetic clutches 115, is opened, thereby preventing further horizontal motion. As soon, however, as the up motion (by clutch N) has relieved the lateral pressure on the spindle 119, the back contact circuit 52 will be opened by movement of the contact lever 125, to a position corresponding to that shown in Fig. 6, and another increment of horizontal motion will be effected. This alternate horizontal and vertical motion will then continue until the tracer passes over the upward incline.

In order that the operation may be more clearly understood, the tracer spindle 119, in Figs. 3 to 7, has been shown upright, with the end of the tracer point cooperating with the pattern, but, in most cases, it is preferable to operate with the tracer spindle at right angles to the plane of the profile of the pattern as indicated by the dotted circles adjacent the tracer point in Figs. 3 to 7.

While we have shown and described our improvement as preferably adapted for a planer, it will be understood that substantially the same arrangement of circuits and tracer control can be adapted for the shaper, slotter and other types of machines, wherein a linear cut is effected by relative reciprocation between the tool and the work, and furthermore, we do not wish to be limited to the specific details of construction or arrangement of circuits and relays, for obviously, various modifications and rearrangements thereof may be made without departing from the spirit and scope of the invention.

We claim:—

1. In the electrical control of the feed of planers and like machine tools, the combination with the tool and a reciprocating member for effecting a linear cut on the work, of magnetic clutches for effecting relative toward and from feed between the tool and work, an electric tracer adapted to follow a pattern for controlling the operation of said magnetic clutches for the toward or from feed, a relay adapted to be operated by said tracer for closing circuits to the respective clutches for said feeds, a second relay required to be closed to complete the circuit closed by the first relay to the respective magnetic clutches, and means controlled by the reciprocating member for operating said second relay, whereby the tracer control of said feed is effective only while said second relay is in circuit closing position.

2. The electrical control of the feed of planers and like machine tools, as claimed in claim 1, wherein operation of said second relay for closing the clutch circuit adapted to be completed through the first relay is effected by circuit closing means operating independently of the reciprocating member but controlled by a switch operated by the reciprocating member.

3. The electrical control of the feed of planers and like machine tools, as in claim 1, wherein magnetic clutches are provided for effecting relative transverse feed between the tool and work for the successive cuts and a split magnet relay with its magnets in parallel circuit with the respective magnets of said tracer operated relay for the toward and from feeds is adapted to break the circuit of the magnetic clutch for transverse feed when said tracer operated relay is operated for toward or from feed.

4. In the electrical control of the feed of planers and like machine tools, the combination with the tool and a reciprocating member for effecting a linear cut on the work, of magnetic clutches for relative transverse feed between the tool and work for successive linear cuts a tracer adapted to follow a pattern and provided with contacts for circuits controlling the energizing of said clutches for transverse feed, a split magnet relay normally closing an energizing circuit for the transverse feed clutch to be operated, adapted to be actuated by said tracer for breaking said energizing circuit to prevent transverse feed, a second relay normally holding the energizing circuit of the transverse feed clutch open and required to be actuated to close said circuit for effecting the transverse feed, means controlled by the reciprocating member for operating said second relay to close the clutch energizing circuit to thereby effect transverse feed when said split magnet relay is closed.

5. The electrical control of the feed of planers and like machine tools as in claim 4, wherein one of said magnetic clutches is energized by the circuit controlled by said relays for transverse feed to the right and another for transverse feed to the left and manual switches are provided for placing in said relay controlled circuit one or another of said magnetic clutches according to the direction of feed desired.

6. The electrical control of the feed of planers and like machine tools, as in claim 4, wherein independently operated means is provided for actuating said last named relay to close the clutch energizing circuit and a switch adapted to be operated by the reciprocating member is adapted to effect operation of said independently operated means at predetermined intervals.

7. The electrical control of the feed of planers and like machine tools, as in claim 4, wherein other magnetic clutches are provided for relative toward and from feed between the tool and the work and a two-way relay in parallel circuit with said split relay and under the control of said tracer is adapted for closing the respective circuits of said other magnetic clutches for either toward or from feed, the circuit connections of the tracer and of the relays being such that said split magnet relay is actuated to break the energizing circuit of the clutches for transverse feed when said two-way relay closes the circuit for either toward or from feed.

8. In the electrical control of the feed of planers and like machine tools, the combination with the tool and a reciprocating member for effecting a linear cut on the work, of magnetic clutches for relative toward and from feed between the tool and work, magnetic clutches for relative transverse feed, an electric tracer adapted to follow a pattern for controlling said magnetic clutches for the respective feeds, said tracer having contacts for opening and closing relay circuits, a two-way relay adapted to be operated by said tracer for closing circuits of the clutches for toward or from feed, a split magnet relay normally closing the circuit to said clutches for the transverse feed, in parallel circuit with said two-way relay and adapted to be operated simultaneously by the tracer to break the transverse feed clutch circuit when said two-way relay is operated to close the circuit for toward or from feed, an auxiliary relay operated independently of the tracer for closing the clutch circuit through said two-way relay, to permit either toward or from feed under the control of the tracer, a second auxiliary relay operated independently of the tracer for closing the clutch circuit through said split magnet relay to permit transverse feed under control of the tracer, means for closing circuits for operating both of said auxiliary relays independently of the tracer and means adapted to be operated by said reciprocating member for effecting operation of said independently operated circuit closing means.

9. The electrical control of the feed of planers and like machine tools as in claim 8, wherein said independently operated circuit closing means comprises a commutator adapted to be rotated for closing the circuits for said auxiliary relays, detent means for preventing rotation of said commutator and means operated by the reciprocating member at predetermined intervals for operating said detent and releasing the commutator to permit the respective feeds.

10. The electrical control of the feed of planers or like machine tools, as in claim 8, wherein said independently operated circuit closing means comprises a single contact commutator mounted for rotation frictionally by a continuously rotating shaft for closing circuits for operating both of said auxiliary relays, a detent for preventing rotation of said commutator, an electro-magnet for operating said detent to release the commutator for rotation, a switch adapted to be operated by said reciprocating member for closing the circuit of said magnet and releasing the detent and means cooperating with said detent for limiting said commutator to a single rotation each time it is released.

11. The electrical control of the feed of planers and like machine tools as in claim 8, wherein a drum switch for completing said relay circuits is adapted in one position to complete circuits for electric tracer control of the feeds through said relays and in another position to eliminate tracer control and complete circuits to a control switchboard and switches in said switchboard are provided for direct manual control of the respective feeds direct and through said relays.

12. In the electrical control of the feed of planers and like machine tools, the combination with the tool and a reciprocating member for effecting a linear cut on the work, of magnetic clutches for relative feed between the tool and the work, relays for controlling circuits to the magnetic clutches for effecting relative feed, a rotatable commutator for closing circuits for operating said relays, means tending to rotate said commutator, detent means for preventing rotation of said commutator, means operated by said reciprocating member for operating said detent and releasing said commutator for rotation, and means cooperating with said detent for limiting the commutator to a single rotation when released.

13. The electrical control of the feed of planers and like machine tools, as in claim 12, wherein switches and circuits are provided for manual control of the respective feeds and for normal automatic operation.

14. The electrical control of the feed of planers and like machine tools, as in claim 12, wherein means is provided for varying the length of time the circuits of said relays are closed during each rotation of said commutator, comprising a contact brush cooperating with a wedge-shaped contact plate on the commutator and means for varying the position of the brush along the wedge.

15. In the electrical control of the feed of planers and like machine tools wherein a reciprocating member effects the cut, magnetic clutches effecting relative feed for successive cuts, a commutator for closing circuits for effecting said relative feed at predetermined intervals, a friction drive for urging rotation of the commutator at predetermined speed, a detent normally preventing rotation of the commutator by the friction drive, an electro-magnet for releasing said detent, a switch for closing the circuit of said magnet for operating the detent and releasing the commutator for rotation, and means operated by the reciprocating member for closing said switch.

16. The electrical control of the feed of planers and like machine tools as in claim 15, wherein means operated in conjunction with the operation of said detent to release the commutator is adapted for limiting said commutator to a single rotation at each operation of said switch.

17. The electrical control of the feed of planers and like machine tools as in claim 15, wherein the commutator is provided with a circuit closing contact plate of varying width cooperating with a shiftable contact brush and means is provided for shifting the contact brush to vary the length of time the commutator will close the feed control circuits.

18. In the electrical control of the feed of planers and like machine tools, the combination with the tool and a reciprocating member for effecting a linear cut on the work, of magnetic clutches for relative toward and from feed between the tool and the work, magnetic clutches for relative transverse feed, a control switchboard having switches for placing in operation circuits for the respective feeds, a two-way relay adapted to be placed in operation by manual switches in the control switchboard for closing circuits for energizing the clutches for toward or from feed, a split magnet relay normally closing a circuit for energizing the clutches for transverse feed in parallel circuit with said two-way relay, the circuits being arranged for simultaneous operation of said relays so that the split magnet relay will break the transverse feed clutch circuit when said two-way relay is operated to close the clutch circuit for toward or from feed, an auxiliary relay operated independently of the control switchboard for closing the clutch circuit through said two-way relay to permit either toward or from feed when the corresponding manual switch is closed, a second auxiliary relay also operated independently for closing the clutch circuit through said split magnet relay to permit transverse feed when the corresponding manual switch in the control switchboard is closed, independently operated means for closing circuits for operating both of said auxiliary relays independently of the control switchboard and means adapted to be operated by said reciprocating member for initiating operation of said independently operated circuit closing means.

19. The electrical control of the feed of planers and like machine tools as in claim 18, wherein said independently operated circuit closing means comprises a rotatable commutator for closing the circuits of said auxiliary relays for a limited period, means urging rotation of said commutator, detent means for preventing rotation of the commutator except at predetermined intervals, and means operated by the reciprocating member for operating said detent and releasing the commutator to close said relay circuits and permit the respective feeds when the corresponding manual switches are operated in the control switchboard.

20. The electrical control of the feed of planers and like machine tools as in claim 18, wherein switches in said control switchboard are provided with circuits for direct operation of the respective clutches for the feeds without operation of said auxiliary relays and their independently operated circuit closing means.

JOHN C. SHAW.
ROBERT D. SHAW.